W. SCOTT.
COMBINED LEVELING DEVICE AND DRIVE GEAR.
APPLICATION FILED JUNE 10, 1912.
1,072,043.
Patented Sept. 2, 1913.
2 SHEETS—SHEET 2.
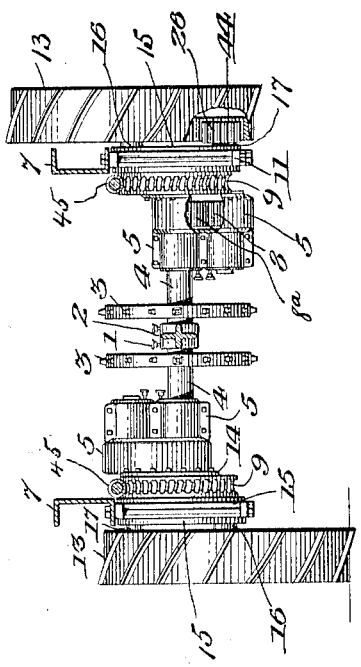
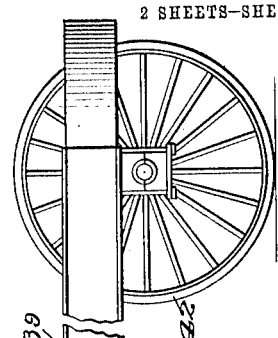
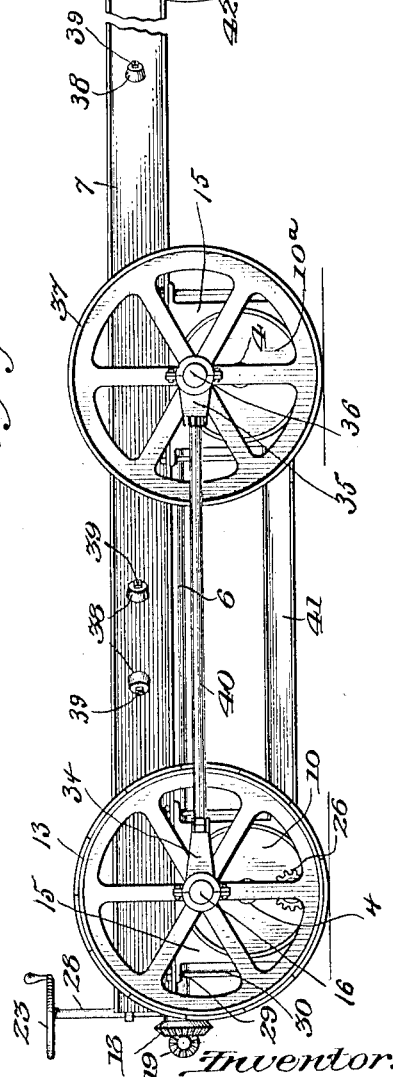

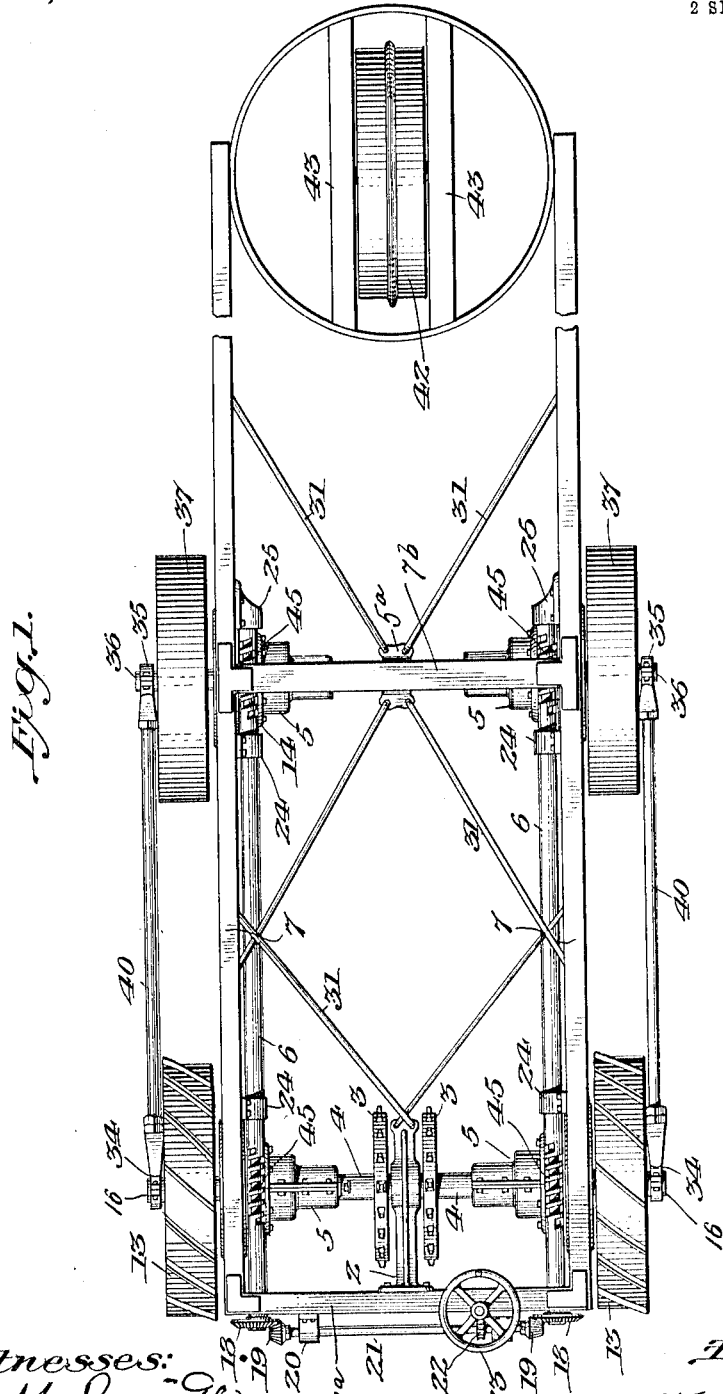

UNITED STATES PATENT OFFICE.

WALTER SCOTT, OF SNAKE RIVER, WASHINGTON.

COMBINED LEVELING DEVICE AND DRIVE-GEAR.

1,072,043.

Specification of Letters Patent.

Patented Sept. 2, 1913.

Application filed June 10, 1912. Serial No. 702,933.

*To all whom it may concern:*

Be it known that I, WALTER SCOTT, a citizen of the United States, residing at Snake River, in the county of Franklin and State of Washington, have invented certain new and useful Improvements in Combined Leveling Devices and Drive-Gears, of which the following is a specification.

This invention relates to agricultural and other tractors which, in order to properly operate, require to be leveled when running on uneven ground.

It is the object of the invention to provide a novel and improved leveling means combined with a drive gear, this object being attained by a combination and arrangement of parts to be hereinafter described and claimed.

In order that the invention may be better understood, reference is had to the accompanying drawings, in which—

Figure 1 is a plan view of the chassis and running gear of a tractor equipped with my improved leveling device and drive gear; Fig. 2 is a side elevation thereof, and Fig. 3 is a cross-section, partly broken away, looking in the direction of the rear or drive wheels.

Referring specifically to the drawings, 7 denotes the side-bars of the chassis, the same being connected by a rear cross-bar $7^a$, an intermediate cross-bar $7^b$ and diagonal brace rods 31, the latter passing through the side-bars and being secured by nuts 39, with angle-washers 38 interposed between the nuts and the outside of the side-bars. At the front end of the machine is mounted a support 43, carrying a steering wheel 42. These parts, as well as the engine, control devices, etc., may be arranged in any ordinary or preferred manner, and as they form no part of the present invention a detailed description thereof is deemed unnecessary.

The tractor is provided, intermediate its ends, with wheels 37, and at the rear with wheels 13, the former being idle, and the latter being the traction or drive wheels whereby the machine is propelled.

The wheels 13 are carried by stub-axles 16, and the latter are carried by circular blocks or disks 10. The stub-axles are mounted off the center of the blocks, or eccentrically, and the blocks are mounted on axially alined axle sections 4 passing centrally therethrough and supported at their inner ends in a bearing 2 carried by the cross-bar $7^a$. Thus, when the blocks are rotated about the axle sections, the wheels 13 are raised or lowered. The stub-axles are located diametrically opposite each other relative to the axle sections, in view of which it will be evident that when one of the wheels is being elevated, the other wheel is being lowered, and vice versa, which produces a counterbalance, and reduces to a minimum the amount of labor which would otherwise be required to adjust the wheels.

The wheels 37 are supported in the same manner as the wheels 13 on stub-axles 36 carried by blocks $10^a$, mounted on axially alined axle sections having supports $5^a$.

The blocks 10 and $10^a$ are mounted to turn in bearings 15 carried by the side-bars 7 and connected by a beam 41, and the stub-axles 16 and 36 are connected by rods 40, said rods having clamps 34 and 35, respectively, at their ends for connection to the said axles. By means of this connection between the stub-axles, the wheels 13 and 37 are constrained to move together when adjusted.

The following means are provided for effecting the vertical adjustment of the wheels 13 and 37 for the purpose of leveling the machine: In bearings 24 and 25 on the side-bars 7 are mounted longitudinal horizontal shafts 6 having worms 45 which are in mesh with worm gear teeth 9 on the peripheries of the blocks 10 and $10^a$. Any suitable means may be provided for rotating the shafts 6. I have shown said shafts provided with bevel gears 18 at their rear ends, said gears being in mesh with bevel gears 19 on a transverse horizontal shaft 21 supported in bearings 20 carried by the cross-bar $7^a$. The shaft 21 is operated by a worm gearing 22, the worm shaft, which is indicated at 28, being provided with a hand-wheel 23. Through this gearing the shafts 6 are rotated when the hand-wheel 23 is operated.

As hereinbefore stated, the wheels 13 are the traction or drive wheels whereby the machine is propelled over the ground. The following drive gear is provided whereby the power of the engine is transmitted to said wheels independently and without regard to their relative positions vertically.

Each drive-wheel 13 has an internal gear 44 with which meshes a pinion 26 fast on a shaft 17 journaled in the corresponding disk 10. The shafts 17 are geared, respectively, to the axle sections 4, said shafts carrying pinions 8 which are in mesh with pinions 8ᵃ on the axle sections. On each axle section is a sprocket wheel 3 suitably connected to the engine or drive motor, said axle sections being thus independently driven. Any other suitable driving connection may be provided. Housings 5 inclose the gears.

I claim:

1. In a leveling device, the combination of ground wheels, stub axles on which said wheels are mounted, circular blocks supporting said axles, the axles being located off the center of the blocks and diametrically opposite each other relative to said center, bearings in which the blocks are rotatably mounted, and means for rotating the blocks.

2. In a tractor, the combination of the traction wheels, stub-axles carrying said wheels, rotatable supports for the stub-axles, said stub-axles being located off the center of the supports, means for rotating the supports, axially alined drive axle sections, driving means for the axle sections, and gearing between the axle sections and the traction wheels.

3. In a tractor, the combination of the traction wheels, said wheels having internal gears, stub-axles carrying said wheels, rotatable supports for the stub-axles, said stub-axles being located off the center of said supports, shafts journaled in the supports, pinions on the shafts in mesh with the internal gears, axially alined drive axle sections, gearing between said axle sections and the aforesaid pinion shafts, and means for rotating the supports.

4. In a tractor, the combination of the traction wheels, said wheels having internal gears, stub-axles carrying said wheels, rotatable supports for the stub-axles, said stub-axles being located off the center of said supports, shafts journaled in the supports, pinions on the shafts in mesh with the internal gears, axially alined drive axle sections carrying the supports, gearing between said axle sections and the aforesaid pinion shafts, and means for rotating the supports.

5. In a tractor, the combination of the traction wheels, said wheels having internal gears, stub-axles carrying said wheels, rotatable supports for the stub-axles, said stub-axles being located off the center of said supports, shafts journaled in the supports, pinions on the shafts in mesh with the internal gears, axially alined drive axle sections, pinions on the axle sections, pinions on the aforesaid shaft in mesh with the last-mentioned pinions, and means for rotating the supports.

6. In a tractor, the combination of the traction wheels, said wheels having internal gears, stub-axles carrying said wheels, rotatable supports for the stub-axles, said stub-axles being located off the center of said supports, shafts journaled in the supports, pinions on the shafts in mesh with the internal gears, axially alined drive axle sections carrying the supports, pinions on the axle sections, pinions on the aforesaid shaft in mesh with the last-mentioned pinions, and means for rotating the supports.

In testimony whereof I affix my signature in presence of two witnesses.

WALTER SCOTT.

Witnesses:
 LEONARD M. NAUGHT,
 EDWARD L. BROWN.

---

Copies of this patent may be obtained for five cents each, by addressing the "Commissioner of Patents, Washington, D. C."